(12) United States Patent
Rantrua

(10) Patent No.: US 7,419,325 B2
(45) Date of Patent: Sep. 2, 2008

(54) TUBE ASSEMBLING DEVICE

(76) Inventor: Jean Rantrua, Giroune, Montgaillard (FR) F-81630

( * ) Notice: Subject to any disclaimer, the term of this patent is extended or adjusted under 35 U.S.C. 154(b) by 333 days.

(21) Appl. No.: 10/522,160

(22) PCT Filed: Jul. 11, 2003

(86) PCT No.: PCT/FR03/02195

§ 371 (c)(1),
(2), (4) Date: Jan. 24, 2005

(87) PCT Pub. No.: WO2004/012170

PCT Pub. Date: Feb. 5, 2004

(65) Prior Publication Data

US 2005/0260031 A1 Nov. 24, 2005

(30) Foreign Application Priority Data

Jul. 24, 2002 (FR) ................................. 02 09363
Apr. 22, 2003 (FR) ................................. 03 04910

(51) Int. Cl.
*F16B 7/04* (2006.01)

(52) U.S. Cl. .................... 403/217; 403/170; 446/85; 446/107; 434/278; 434/279; 434/614

(58) Field of Classification Search ................. 403/170, 403/171, 174, 175, 176, 217; 273/156, 276, 273/278, 281, 298; 446/85, 107; 434/278, 434/279, 614; 52/81.3, 655.1, 655.2
See application file for complete search history.

(56) References Cited

U.S. PATENT DOCUMENTS 3,554,584 A 1/1971 Brumlik
4,020,566 A 5/1977 Dreiding

*Primary Examiner*—Gregory J. Binda
*Assistant Examiner*—Daniel J. Mills
(74) *Attorney, Agent, or Firm*—Young & Thompson

(57) ABSTRACT

A tube assembling device consisting of hub-carriers and hubs for erecting three-dimensional structures. The hub-carriers consist of two pairs of half-rings, bearing tongues offset by 90° along an antero-posterior axis and linked by four connecting lugs, they support radial hook-shaped expansions. The hub-carriers can link two tubes in a fixed or balanced position, can be fixed at the tube end, can be fixed along a tube and support hubs. The hubs support tongues are positioned folded or unfolded inside the tubes used for the construction of the radial expansions into rings and catching teeth internal to the rings. The assembly enables the hubs and hub-carriers to be linked by tubes or elastic links and constitute by folding or combining the hubs and hub-carriers nodes for modelling structures of numerous types from a reduced number or elements.

18 Claims, 7 Drawing Sheets fig. 12
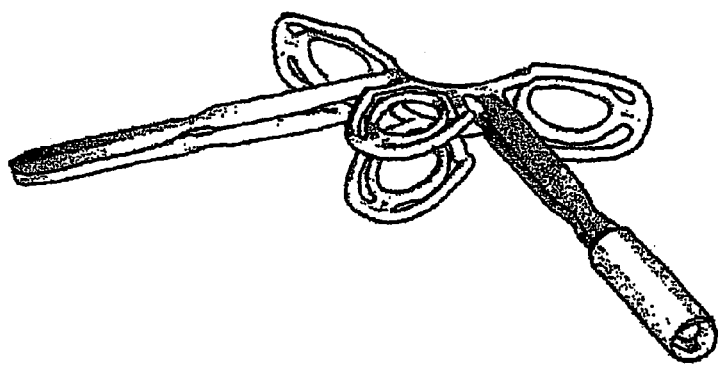
fig. 13
fig. 14
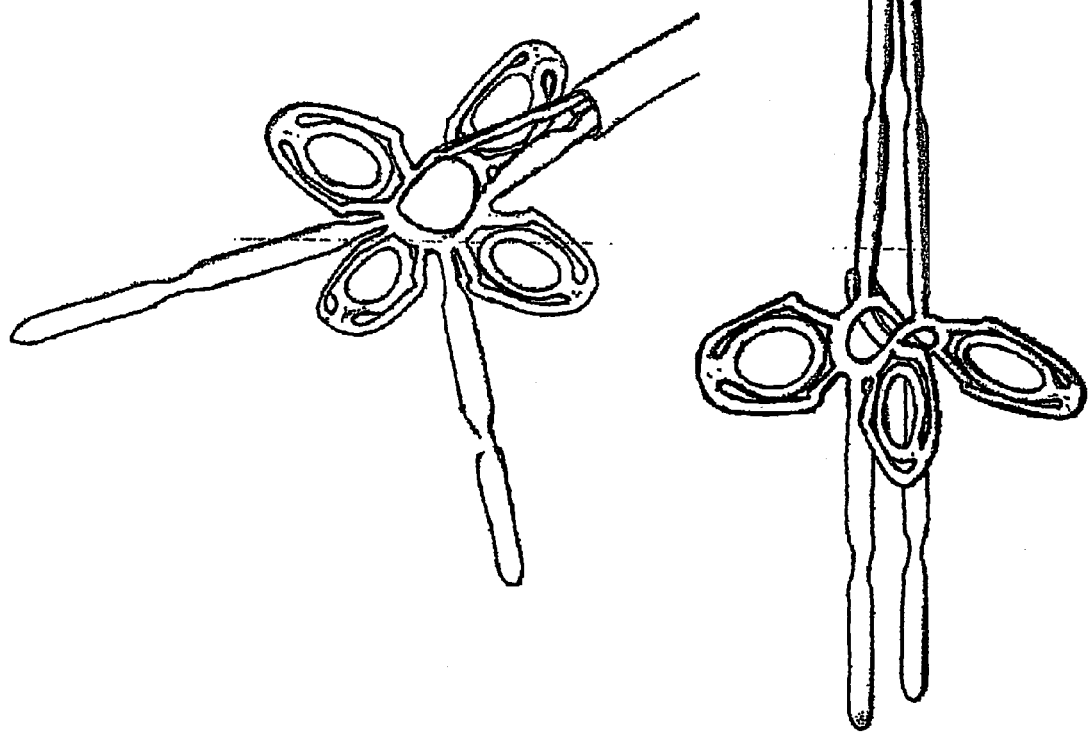

TUBE ASSEMBLING DEVICE

The invention relates to a tube-assembling device consisting of flexible hubs, hub-carriers and tubes for erecting two- or three-dimensional structures, which may be rigid, convertible or elastic. Those structural elements may be used for art teaching, for the study and application of Geometry, Chemistry, Technology or any other subject which is often made easier by the construction of two- or three-dimensional structures. Those assemblies may also be used for building structures fitted for housing or furniture if suitable device and materials are used.

Said three-dimensional structures are made of junction nodes and tubes. Said nodes of the structure may be either elementary, i.e. composed of a single hub, or complex, i.e. composed of several hubs combined directly or through a hub-carrier.

This device allows:

- to connect to a hub to tubes of different diameters, typically 25% more or less of a said average value defined for the dimensions of a hub or a hub-carrier.
- to obtain the required length between two nodes by cutting the tube to the right length without any transformation of end of tubes used in the structure.
- to obtain a great diversity in the number of arms resulting from a single or a complex node.
- to obtain numerous direction for arms stemming from a node with a reduced number of elementary hubs.
- to fix a simple or a complex node at the end of a tube.
- to adjust a node along a tube, which once adjusted, may remain movable on the tube.
- to obtain a high cohesion between the elements of the device by linking building elements of said structure with elastic or non-elastic bonds fixed on specific parts of hubs and hub-carriers.

SUMMARY OF THE INVENTION

One or several hubs can be fixed on the outer side of a hub-carrier. The inner side of a hub-carrier includes tongues (1), which may be inserted into the tube representing the axis of the structure, or surround the said tube.

Radial hook-shaped expansions (2) on the connecting lugs (10, 11) of a said hub-carrier or on divergent tongues (12) coming out from anterior half rings (8) of a said hub-carrier enable the said hub-carrier to be connected to other elements of structures with preferably elastic links (21) for modelling structures which may be deformed.

Hubs consist of radial arms (3) and radial rings (4) with internal catching teeth (5, 6, 7) in direction of the said hub's axis. These catching teeth may be linear (5) or anchor shaped (6). Said catching teeth may show an inner circular or oblong hole (7) wide enough to insert a tube used for the structure.

When assembling the device, hubs, hub-carriers and tubes may be combined directly or indirectly with one another for modelling structures of numerous types.

Links (21) connecting different elements of the device may be fixed to the tooth shaped expansions (5, 6, 7) of the hub axial ring. It also makes it possible to insert a tube in the hole (20) of one or several catching teeth (7) hold by one or several radial rings or by one or several hub's radial rings (4) themselves if the diameter of the tube is superior to the maximal diameter usable for tooth hole (7) of said radial rings.

These catching teeth (5, 6, 7) may also be inserted into a tube's end by being slightly compressed if they belong to the anchor shaped type (6) or to the pierced type (7).

BRIEF DESCRIPTION OF THE DRAWINGS

Attached drawings describes the invention:

FIG. 12 is the view of a hub being folded along the axis of two opposite radial rings (4).

FIG. 13 is the view of two adjacent tongues (3) of a hub when being folded.

FIG. 14 is the view of two opposite hub's pair of tongues (3) being folded in opposite directions.

DETAILED DESCRIPTION OF THE PREFERRED EMBODIMENTS

Figure 1:
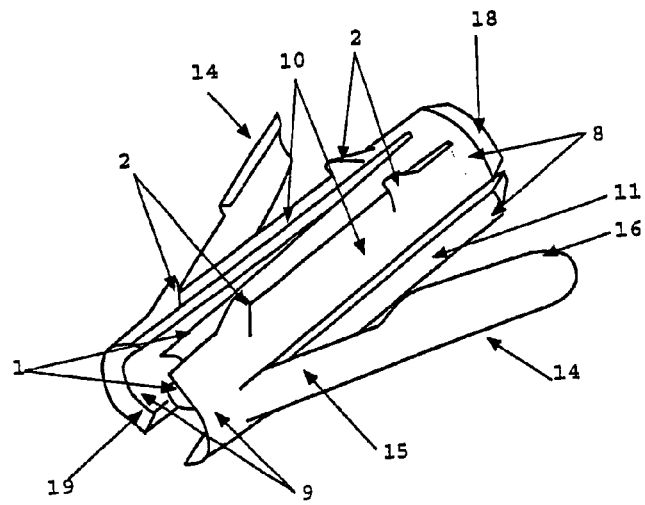
FIG. 1 shows a hub-carrier with hook-shaped expansions on connecting lugs.
Figure 2:
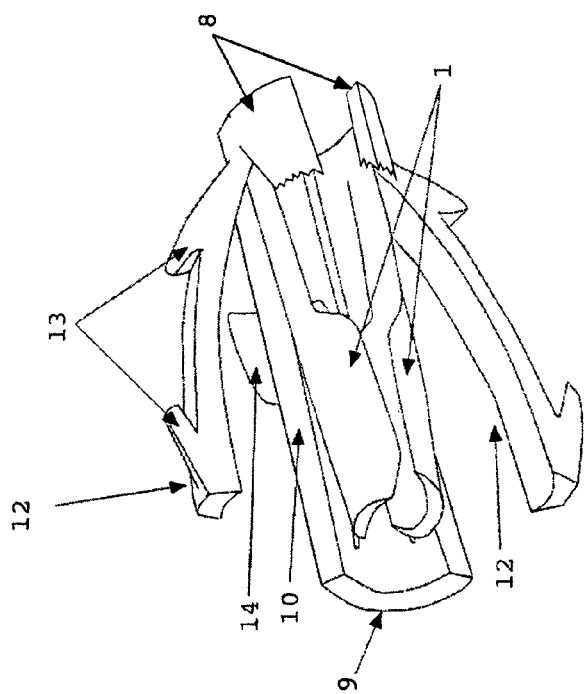
FIG. 2 is the partial view of a hub-carrier's inner structure supporting a pair of divergent tongues (12) issued from anterior half rings.
Figure 3:
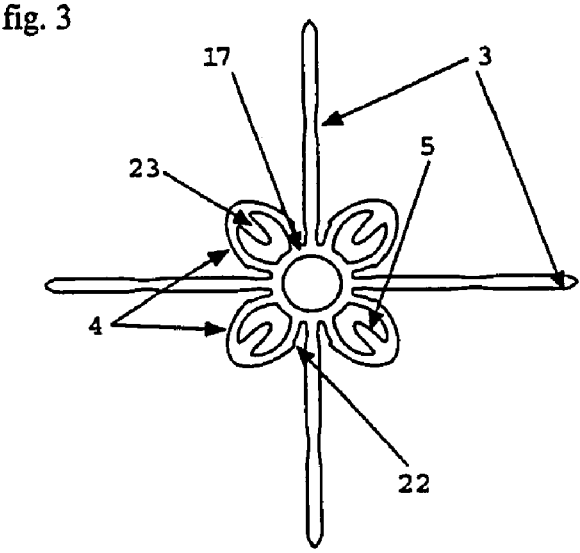
FIG. 3 shows a hub which teeth have a linear shape.
Figure 4:
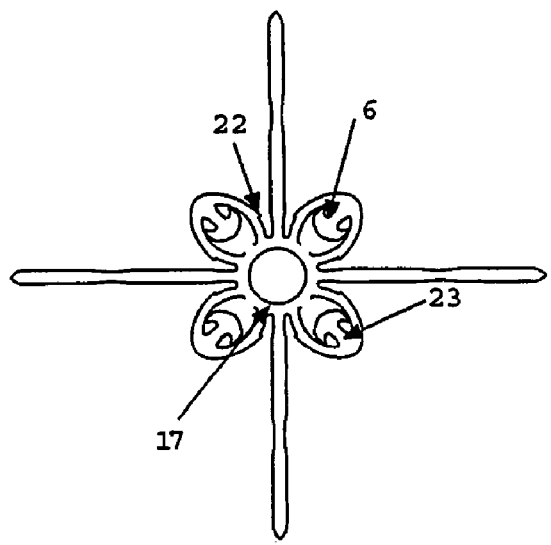
FIG. 4 shows a hub which teeth have an anchor shaped type.
Figure 5:
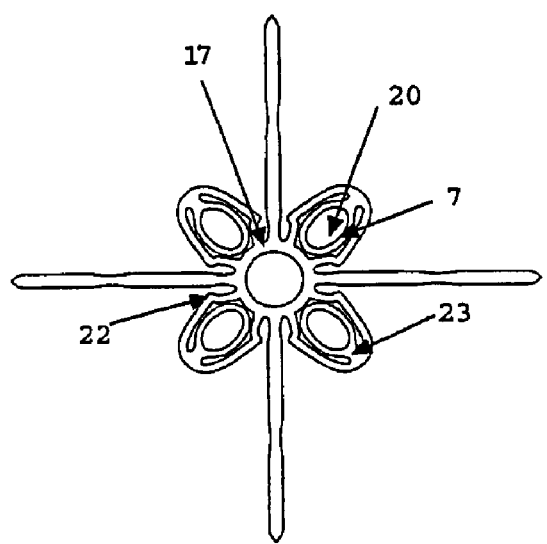
FIG. 5 shows a hub with pierced teeth.
Figure 6:
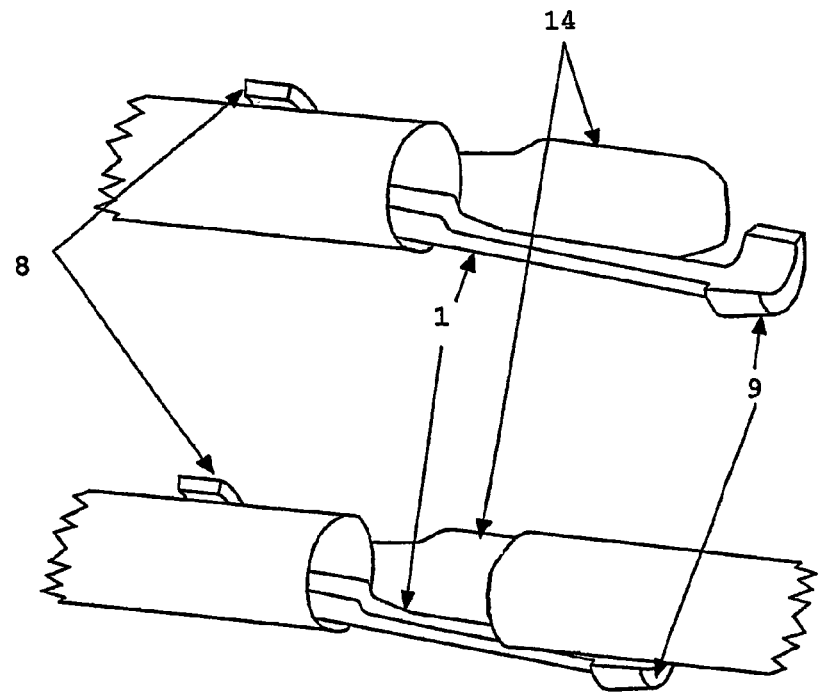
FIG. 6 shows a partial view of a hub-carrier's inner side fixed at a tube's end. The tube not being completely pushed inside, one of the posterior (14) and one of the anterior (1) tongues are not illustrated to show the position of the different building elements.
Figure 7:
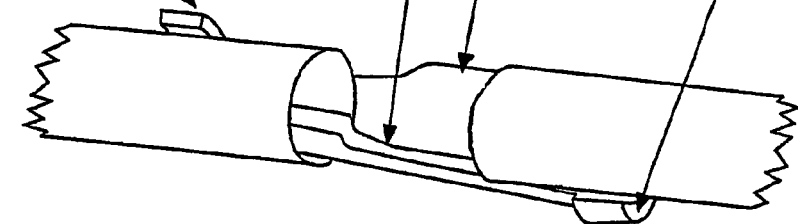
FIG. 7 shows a partial view of a hub-carrier's inner side connecting two tubes. The tubes not being completely pushed inside, one of the posterior (14) and one of the anterior (1) tongues are not illustrated to show the position of the building elements.
Figure 8:
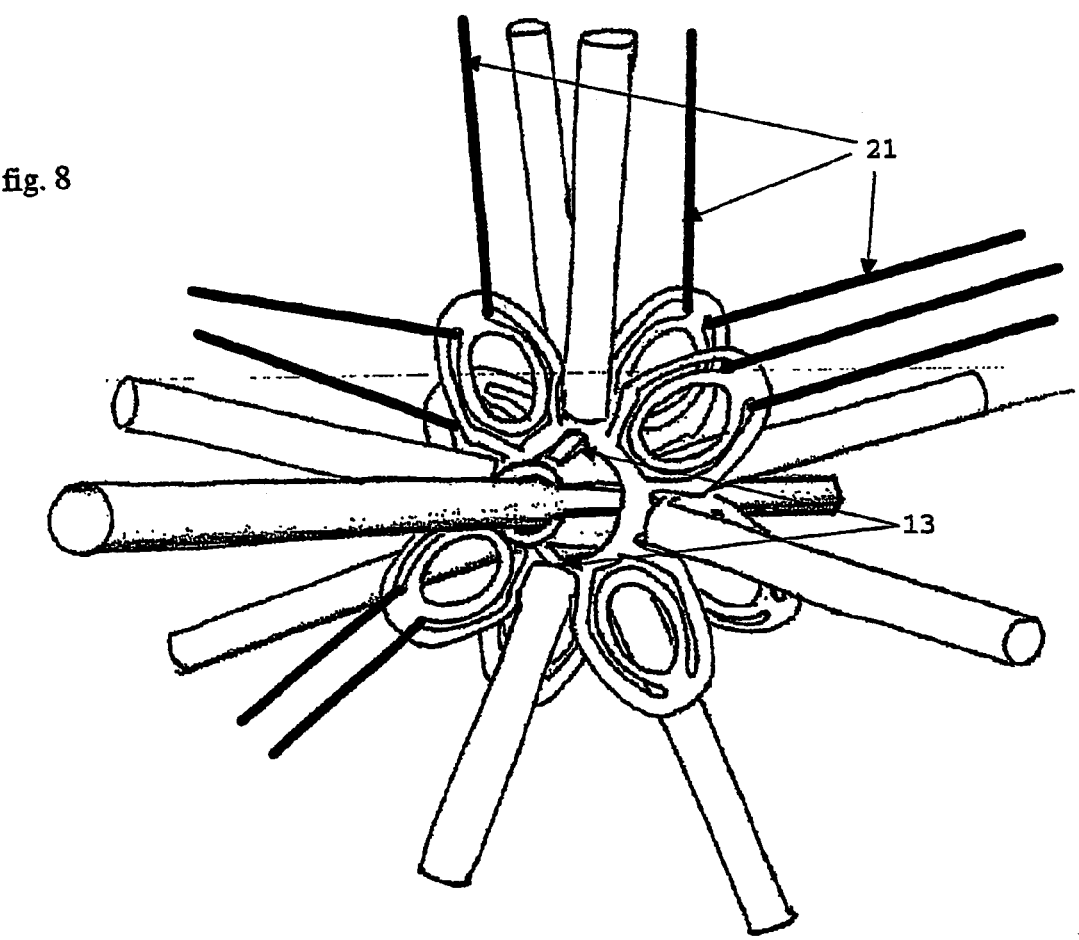
FIG. 8 is the view of a hub-carrier connecting two tubes and supporting two hubs with illustration of some elastic links.

Hub-carriers are made of four half rings (8, 9): two anterior half rings (8) and two posterior half rings (9) linked by four connecting lugs (10, 11). Said lugs (10, 11) make an approximate 90° angle with the half ring's surface (8, 9) of said hub-carriers.

Anterior (8) and posterior (9) pairs of said half rings are shifted of 90 degrees along an antero-posterior axis. Said half rings show complementary convex (18) and concave (19) surfaces, which makes it possible to set them up steadily one versus the other by placing face to face complementary concave and convex faces.

The two upper connecting lugs (10) link the posterior lateral parts of one anterior half ring (8) to the upper parts of left and right posterior half rings (9) of said hub-carrier. The two lower connecting lugs (11) link the posterior lateral parts of the second anterior half ring (8) to the lower parts of left and right posterior half rings (9) of said hub-carrier.

Lugs (10, 11) of said hub-carrier are flexible and may show flexible radial hook-shaped expansions (2). Said expansions allow the location of one or several hubs on said hub-carrier and enable to fix the elastic links, which may connect hub-carriers to other building elements of the structure.

The hub positioning may also occur through a pair of tongues (12) coming out from the middle part of the anterior half rings (8) of said hub-carriers.

Said tongues have, outside of their middle part, expansions (13) between which hubs are fixed when placed on a said hub-carrier.

A tongue (1) with a convex external side is issued from the posterior side of each anterior half ring (8) of said hub-carriers. Said tongue reaches or even goes beyond the level of posterior half rings (9) and nearly reaches the other tongue (1) issued from the other anterior half ring (8) at the same level or after posterior half rings (9) of said hub-carriers.

A tongue with a convex external side (14) comes out from the posterior part of each posterior half ring (9) of said hub-carriers. Said tongue reaches or even outreaches the level of anterior half rings (8) of said hub-carriers. Those tongues are more narrow and thicker at their basis.

Each tongue is narrow (15) on its first approximate half length; then at its approximate middle length it shows a sudden widening with an angle of approx 90° and shows a curve to reach its maximum of width (16). This part of the tongue (1, 14) is bevel-edged towards the inside.

The wider part of said tongues of said hub-carriers shows straight longitudinal sides, which may be thinner than the axial part of said tongues (1, 14).

From those two pairs of tongues, one pair comes from the posterior (14) side and the other comes from the anterior side (1) of a said hub-carrier. The anterior pair (1) belongs to the inner part of said hub-carrier and shows convergent ends. The posterior pair (14) of tongues belongs to the external part of said hub-carrier when the said hub-carrier is not used. But, under normal use, said posterior tongues (14) are pushed inside the said hub-carrier by pushing aside the connecting lugs (10, 11) of said hub-carriers.

Once said posterior tongues (14) have been pushed between the connecting lugs of a said hub-carrier, said connecting lugs (10, 11) come back into their original closed position and avoid that said posterior tongues (14) come out unintendedly. Connecting lugs (10, 11) of said hub-carriers may be made thinner in this part to allow an easier positioning of said posterior tongues (14). Therefore once the tongues (14) have been pushed inside the hub-carrier there is two pairs of tongues (1, 14) issued from opposite sides of said hub-carrier and offset by 90° along an antero-posterior axis.

When one insert a axis into a said hub-carrier, if tongues (1, 14) of said hub-carrier penetrate into the axis, that is if the said hub-carrier is placed at the end of the axis, then the said tube is compressed on one hand by the tongues (1, 14) located inside the said tube and on the other hand by the other pair of tongues and the half rings (8, 9) of said hub-carrier which are pressed on the external side of the said tube. This pressure is increased by the positioning of a hub on a hub-carrier.

If the tongues (1, 14) of a said hub-carrier remain on the external side of the tube, said tube is slightly compressed by half rings (8, 9) via internal tongues (1, 14) of said hub-carrier.

Said hub-carriers also enable to connect two tubes. To achieve this, one has to fix a tube at each end of a hub-carrier by inserting one tube into the posterior part through anterior tongues (1) of said hub-carrier and inserting the second one into the anterior part through the posterior tongues (14) of said hub-carrier.

Each tube is inserted up to the middle part of said hub-carrier. Opposite tongues (1, 14) cross each other and proximal parts of each pair of said tongues (1, 14) are pressed by the pressure of the tube on the distal parts of the other pair of said tongues which fix the tube. This set-up is improved if said hub-carrier carries a hub.

The complementarity of convex and concave forms of anterior face (8) and posterior face (9) of half ring of said hub-carrier make it possible to fit together two sub-structures for creating an oscillating or rotating balanced assembly when two hub-carriers are placed face to face.

Hub carried by said hub-carriers show a flat or cone-shaped axial ring side (17) with a centred hole in it, said hole has a diameter inferior to the biggest width of radial rings (4) of the said hub. Radial expansions, in the form of elongated tongues (3), come from this axial ring (17). Said tongues (3) are narrower at their end and around the middle of each said tongue (3). They may show an oblong hole close to the connection between a radial ring and an axial ring (17) of said hub. Another tongue (3) issued from the same or from another said hub may be passed through this elongated hole in order to change the structure of the node. Hook-shaped or ring-shaped expansions (4) are placed between those tongues (3) and show on their inner side a catching tooth (5, 6, 7) in direction of the axis of radial rings (4) of said hub.

In the middle lateral part of those expansions (4) there is an external prominent zone (22) allowing a better connection of radial rings (4) of a said hub when inserted into the axial hole of a said hub or into another radial ring of a said hub (4) if several hubs are combined with each other.

Said hubs are made of a flexible material. Different spatial configurations expansions of said hubs result from bending the hub along different angles. Either by bending the hub itself or by inserting one or several elements of the hub into one or several elements of the same hub or into another hub it is combined with.

Radial tongues (3) come into the tubes of the structure. One tube may receive one or several tongues (3) of one or different several said hubs. Said radial tongues (3) may be inserted unfolded or folded to increase the quality of the link between the tongue and the tube by the internal pressure of the said tongue inside the said tube.

The catching tooth (5, 6, 7) of a radial ring (4) of a said hub is thicker or wider at its junction point with the radial ring (4). This junction shows round lateral sides in order not to damage the link(s) it supports in some cases. This tooth may be linear (5) and filling at least half of the radial ring's hole (20) or anchor-shaped (6) which makes it possible for the elastic links it may support to endure many different forces without being possible for the link to get free from the said radial ring's (4) tooth (6). Finally the tooth of said radial ring may show an elongated hole (7) enabling to fix elastic links at its junction part with the radial ring (4) but also, when a hub is folded, to pass a tube through this pierced tooth (7) connected to the radial ring (4) by a lug (23).

Figure 9:
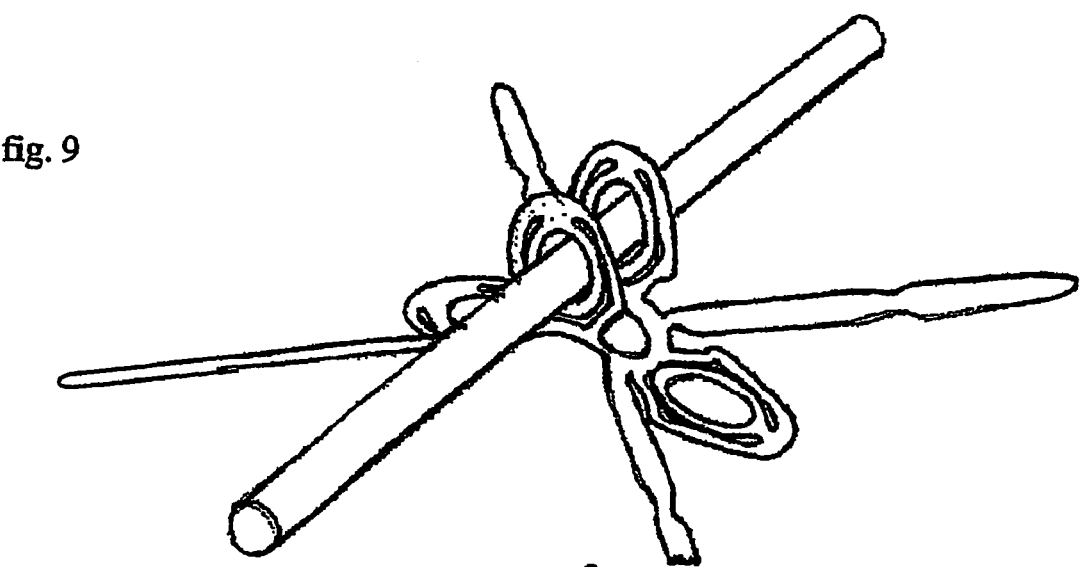
FIG. 9 is the view of hub's folding when a tube is inserted though hub's radial rings (4).

The insertion of a tube into a said pierced tooth—(7) allows:

when two said radial rings (4) are folded, to insert a tube in a direction parallel to the plan of the said hub (FIG. 9).

when said hub is made of four radial rings (4) and when opposite said radial rings are bended on each side of the hub, the crossing of 2 tubes at a 90° angle on each side of said hub.

Figure 10:
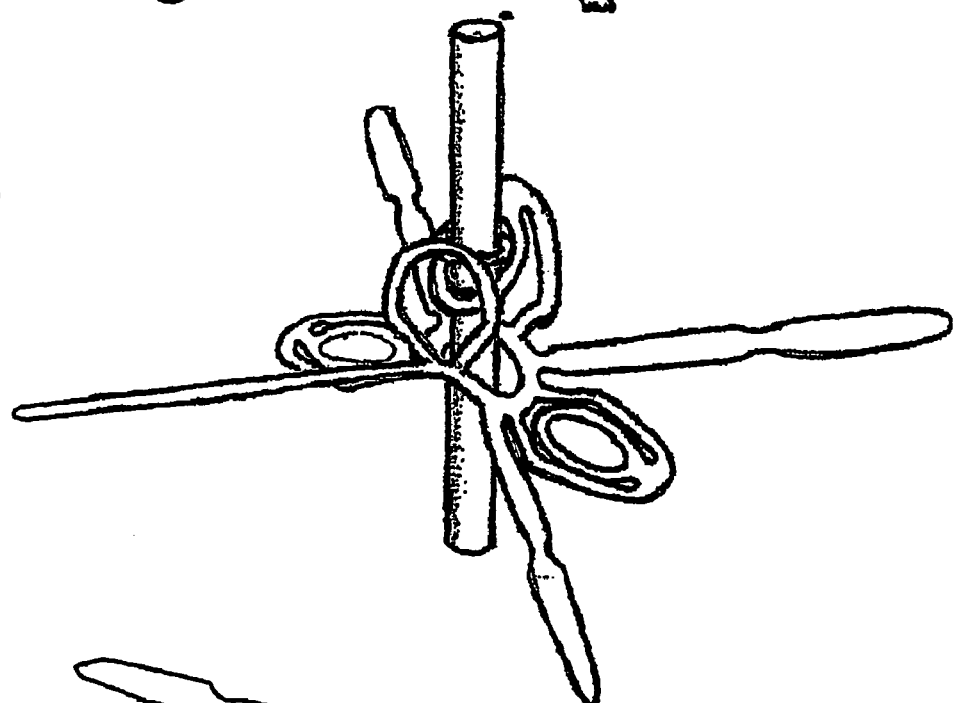
FIG. 10 is the view of a tube being inserted into the axial hole of a hub and inside the radial rings (4) of said hub.

When said hub is made of four radial rings (4) the bending of two opposite said radial rings (4) added to the bending of said pierced teeth (7) allows the insertion and fixing (FIG. 10)

through the said pierced teeth (7) of a tube getting through the axis of the said hub and through the hole (20) of said radial rings (4).

Figure 11:
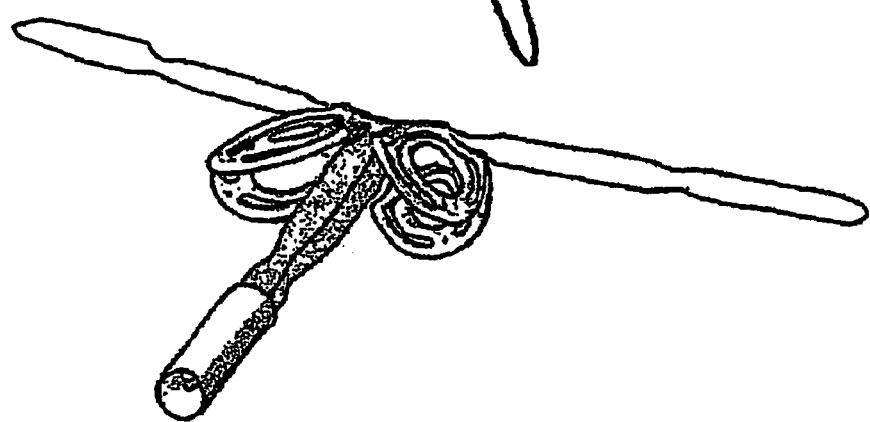
FIG. 11 is the view of a hub being folded along the axis of two opposite tongues (3).

In the case of a hub made of four tongues (3) and four radial rings (4), one may consider the different non-exhaustive possibilities:
- a bending/folding along the axis of two opposite tongues (3) which results in a hub with 3 orthogonal arms (FIG. 11)
- a bending/folding along the axis of two radial rings (4) (FIG. 12) which results in the creation of a hub made of two pairs of perpendicular arms.
- a folding of a tongue (3) of a said hub over the next tongue (3) (FIG. 13) resulting in the modelling of a hub made of legs radiating in 3 different directions only, instead of the four original ones of said 4 rings hub.
- a bending of two pairs of tongues (3) in opposite direction (FIG. 14) which makes it possible, if said tongues (3) of a same pair are pressed one against the other, thus misshaping the axial ring (17) of a said hub, to obtain 2 pairs of opposite tongues (3) on which "to be connected" tubes may be inserted.

Figure 15:
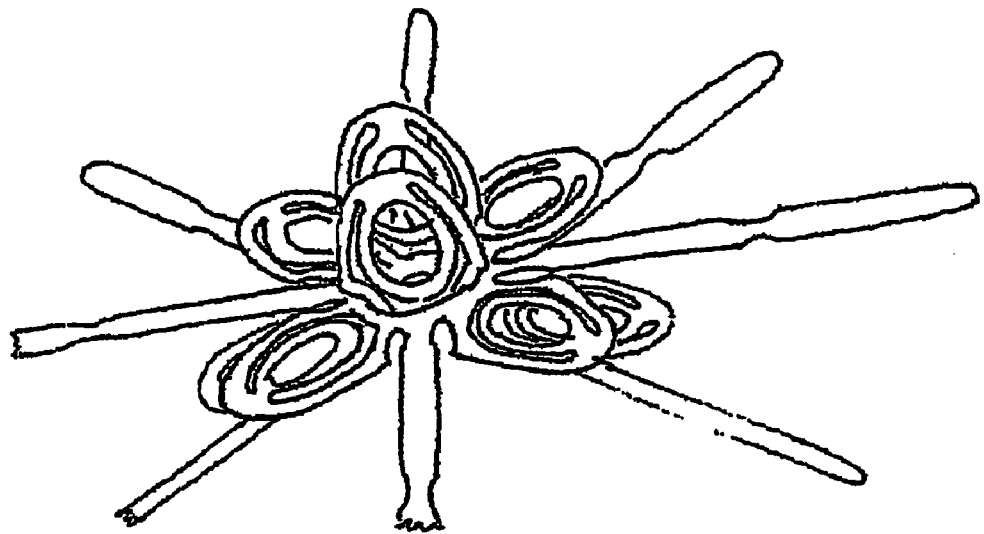
FIG. 15 shows two hubs being combined with one another by insertion of a pair of radial rings into the axial hole of another hub.
Figure 16:
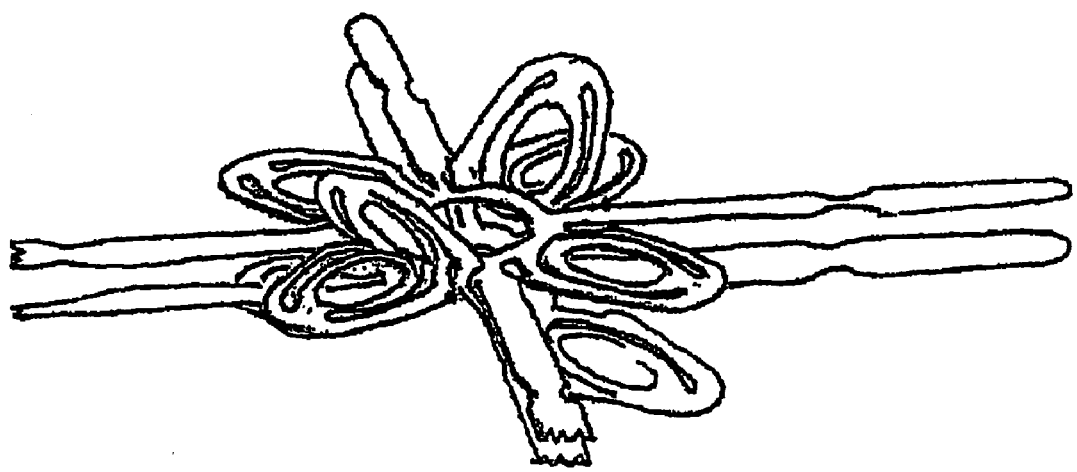
FIG. 16 shows two hubs being combined with one another by insertion of a pair of opposite radial rings (4) into the radial rings (4) of another hub.

Elementary hubs may be combined with one another and form complex hubs. For example, it is possible to combine them—without being exhaustive—as follows:
- the bending of two opposite radial rings (4) on the same side of the axial ring (17) enables, by pushing two pierced teeth (7) one against the other towards the hub axis, allows to fix this said hub at the end of a tube by inserting said tube into the above mentioned teeth.
- a hub can be combined to one or several other hubs by inserting one or several radial rings (4) into the axial hole of another hub (FIG. 15).
- to combine hubs with one another by inserting two radial rings (4) belonging to different hubs by placing two contiguous hubs, one over the other (FIG. 16) or, side by side.
- to combine different hubs by inserting one or several tongues (3) into the hole located at the basis of one or several tongues (3) of different hubs.
- to combine different hubs by inserting conversely or non-conversely radial tongues (3) into the axial hole of another said hub.

These different possible ways of combining building elements are not limited and each one of them can be in turn combined with another one, which still increases the number of possible types of structures.

Figure 17:
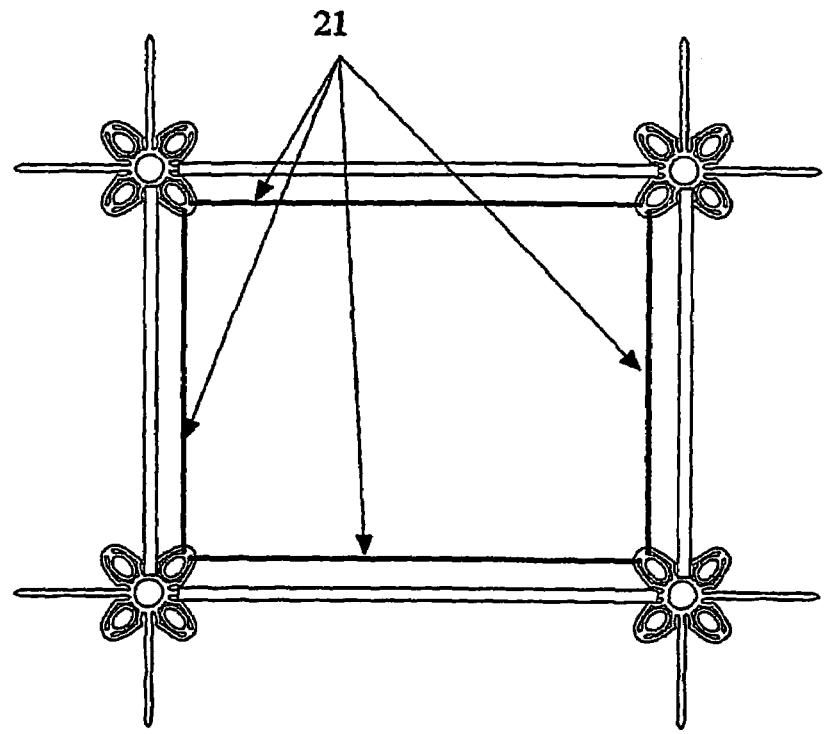
FIG. 17 is the view of a basic building structure showing the circular track of an elastic link.
Figure 18:
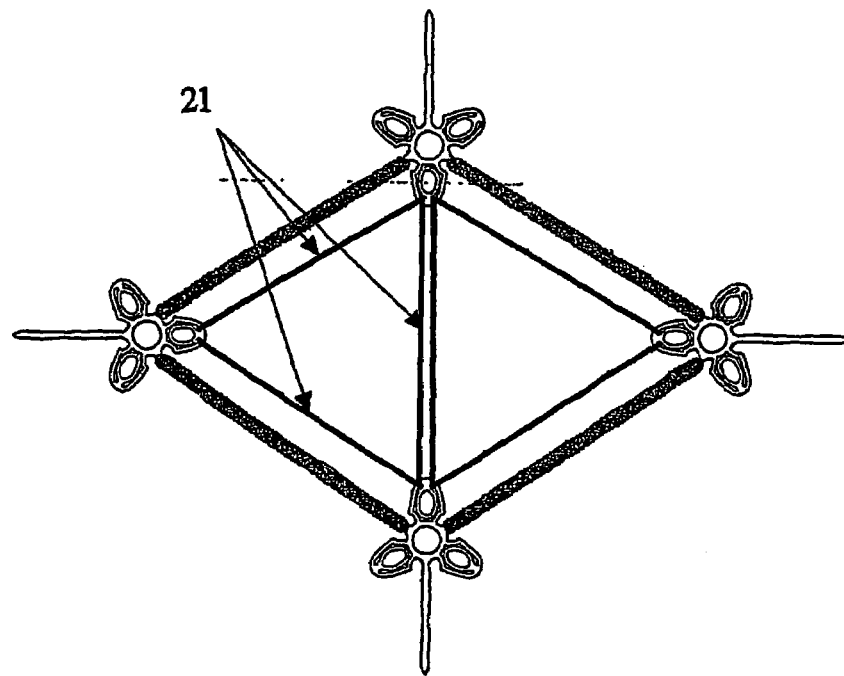
FIG. 18 is the view of a basic building structure with hubs with three tongues connected by two kinds of links.

Links (21) used to connect hub-carriers or to connect hubs are preferably elastic links, they link elements close to one another (FIG. 17, FIG. 18) for example the tops of a polygon being part of the built structure or distant building elements.

If radial rings (4) have teeth (7) showing a hole (20), the crossing section (23) between this tooth (7) and the radial ring (4) may show thicker sides and a thinner axial part in order to allow the folding of the radial ring (4) along the axis of this thinner part to ease the insertion of one radial ring (4) into one of the tubes being part of a bi- or three-dimensional structure.

The invention claimed is:

1. A tube assembling device for erecting two- or three-dimensional rigid or elastic structures, comprising:
   plural flexible hubs; and
   plural hub-carriers, said hubs and hub-carriers being connectable to tubes to be assembled and said hubs being attachable to said hub-carriers,
   said plural flexible hubs each comprising:
      an axial part with a hole in a middle thereof;
      flexible tongues extending radially from said axial part and having a narrow part in a middle of their length; and
      radial rings having catching teeth, said catching teeth being directed toward an axis of the hub,
      said flexible tongues being insertable inside tubes to be assembled, said flexible tongues being one of folded at their narrow section and unfolded, links of a structure to be assembled are fixable at a base of said catching teeth, said hub-carriers each comprising:
   two pairs of half rings, one posterior pair of half rings and one anterior pair of half rings linked by four connecting lugs,
   with:
   two pairs of half rings, comprising, one posterior pair of half rings and one anterior pair of half rings, said two pairs of half rings linked by four connecting lugs,
   at least one pair of tongues extending from one of the pairs of half rings and pointing in a direction of the other of the pair of half rings, so that when a tube is inserted into the hub-carrier either said pair of tongues remain outside the tube and positioning of said hub-carrier is made all along the tube, which is slightly compressed between the pair of tongues, or one tongue of said pair of tongues is inserted inside the tube and positioning of the hub-carrier occurs at an end of the tube.

2. The tube assembling device according to claim 1, wherein said four connecting lugs include flexible hook-shaped radial expansions for fixing elastic links, which may bind different structural elements to be assembled and which may lock one or several said hubs that are fixable on the hub-carrier.

3. The tube assembling device according to claim 1, further comprising divergent tongues extending from said anterior pair of half rings of said hub-carrier, said divergent tongues having expansion elements extending from a surface thereof before and after a median zone of said divergent tongues, said hubs being attached to said hub-carriers by said expansion elements.

4. The tube assembling device according to claim 1, wherein said at least one pair of tongues comprises a pair of convergent tongues extending from a respective one of said anterior pair of half rings of said hub-carrier that converge towards an axis of said hub-carrier and extend towards the posterior part of said hub-carrier.

5. The tube assembling device according to claim 1, wherein said at least one pair of tongues comprises a pair of divergent tongues extending from a respective one of said posterior pair of half rings and extend toward the anterior pair of half rings, said divergent tongues having a maximal width superior to an open space between an adjacent two of said connecting lugs so that said divergent tongues may be locked inside the hub-carrier when said divergent tongues are pushed inside said hub-carrier.

6. The tube assembling device according to claim 5, wherein said four connecting lugs have an inferior thickness at a portion where the divergent tongues are located.

7. The tube assembling device according to claim 1, wherein said at least one pair of tongues comprises a pair of tongues extending from said anterior pair of half rings and a pair of tongues extending from said posterior pair of half rings, each of said tongues having a narrow proximal half part then widening in a middle part to reach a maximal width, so that when tubes to be assembled are inserted through ends of said hub-carrier, said tongues extending from said anterior pair of half rings come into an inserted tube through the posterior part of said hub-carrier and said tongues extending from said posterior pair of half rings come into an inserted tube through the anterior part of said hub-carriers, so that the two pairs of tongues cross each other and the proximal parts of each pair close on the distal parts of the other pair of said tongues which enables two tubes to be connected by their ends.

8. The tube assembling device according to claim 1, wherein said four connecting lugs comprise two superior connecting lugs that link lateral posterior parts of a first one of said anterior pair of half rings to upper parts of left and right ones of said posterior half rings, and two inferior connecting lugs link lateral posterior parts of a second one said anterior pair of half rings to lower parts of left and right ones of said posterior pair of half rings.

9. The tube assembling device according to claim 1, wherein said catching teeth are anchor-shaped so that a pulling force of the links to be assembled may be aimed towards many different directions without links getting loose from said teeth.

10. The tube assembling device according to claim 1, wherein said catching teeth are perforated by a hole having a diameter that is large enough to allow insertion of a tube used for building the structure.

11. The tube assembling device according to claim 1, wherein said radial rings have external prominent zones to lock the radial rings when inserted into the axial hole of said hub or when inserted into a radial ring of another hub.

12. The tube assembling device according to claim 1, wherein a junction point between one of said radial rings and a respective one of said catching teeth is wider or thicker than other parts of said one radial ring to prevent said respective tooth from turning inside out under a pulling force of one of the links to be assembled.

13. The tube assembling device according to claim 1, wherein a portion between one of said catching teeth and said axial ring has a smoothed border in order not to damage any links to be assembled therein.

14. The tube assembling device according to claim 1, wherein outer sides of said anterior and posterior pairs of half rings have complementary convex and concave shapes so that two of said hub-carriers may be connected to form an oscillatable or rotatable balanced structure when placing complementary sides of two different hub-carriers face to face.

15. The tube assembling device according to claim 1, wherein said at least one pair of tongues have a slightly narrower end part that is bevel-edged towards the outside to ease insertion of said at least one pair of tongues.

16. The tube assembling device according to claim 1, wherein said flexible tongues of said hubs have an elongated hole at their bases so that another one of said flexible tongues may be inserted into said hole and remain fixed.

17. The device according to claim 1, wherein said radial rings each have an insertion lug near the axial ring, which enables a tongue of a first one of said hubs to be inserted inside a hole formed by said insertion lug and an axial ring of a second one of said hubs.

18. The device according to claim 1, wherein a connecting portion linking one of said catching teeth to a respective one of said radial rings has at least on one side a narrow axial depressed zone to increase the flexibility of said one of said catching teeth enabling the insertion of said respective one of said radial rings and said one of said catching teeth into a tube of the structure to be assembled.

* * * * *